United States Patent Office 3,322,715
Patented May 30, 1967

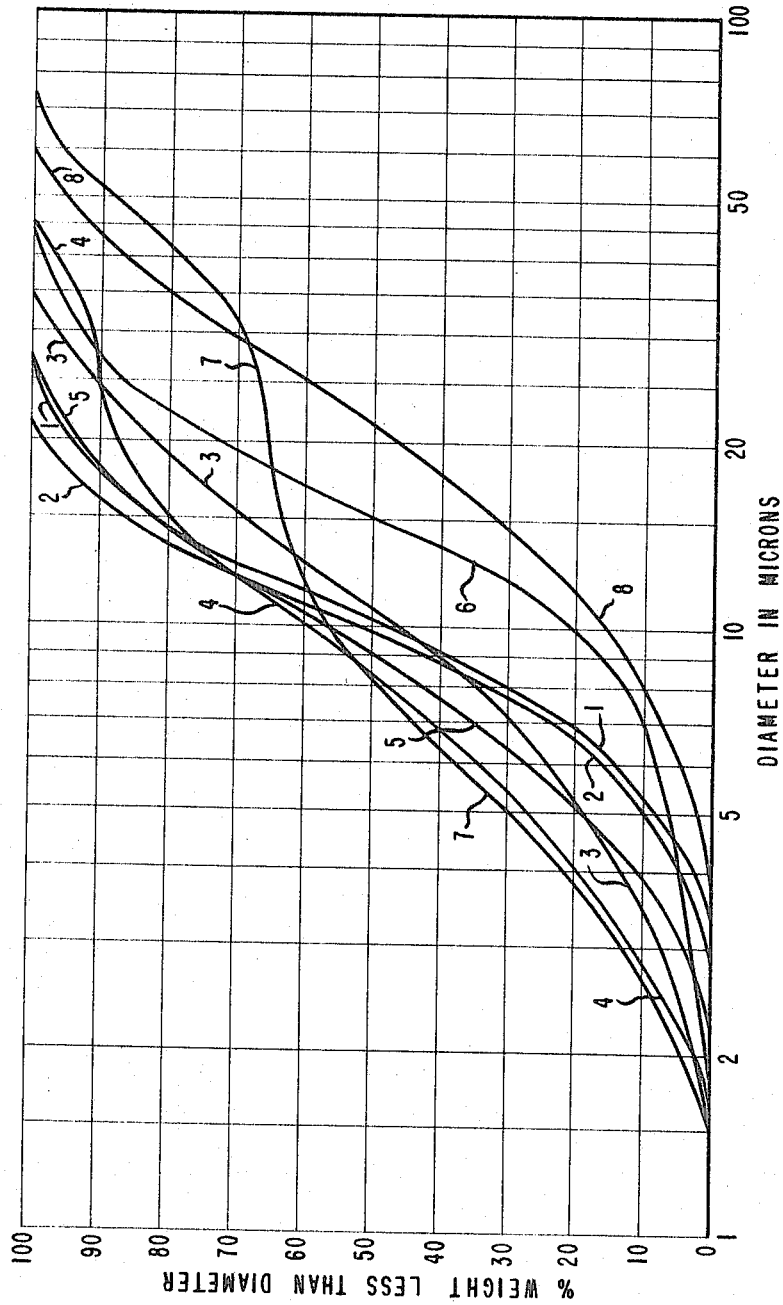

3,322,715
PROCESS FOR MAKING CALCIUM CARBONATE FILLED POLYAMIDE COMPOSITIONS
Miles Charles Kumnick, Fairfax, Del., assignor to E. I. du Pont de Nemours and Company, Wilmington, Del., a corporation of Delaware
Filed Oct. 16, 1963, Ser. No. 316,565
13 Claims. (Cl. 260—37)

This invention relates to calcium carbonate filled polyamide compositions and to the process of forming such compositions.

In the past it has not been feasible to use polyamides to form large structural items such as desk tops, chair seats and backs, cabinets and other furniture and fixture type of items because the polyamide resins are prohibitively expensive for these uses and do not possess the necessary stiffness and dimensional stability.

It is an object of this invention to produce a polyamide resin composition which has the requisite stiffness, toughness and dimensional stability to be useful in fabricating furniture and fixtures. A further object is to produce such a polyamide resin composition which has a high degree of blush resistance. Another object is to produce such a composition which is readily pigmented. Another object is to produce such a composition at a low cost.

These and other objects are accomplished by the following invention in which a solution of an ω-lactam monomer and an anionic polymerization catalyst and cocatalyst are mixed with from 30 to 70 weight percent, based on the total composition, of calcium carbonate particles.

The ω-lactams useful in the present invention are those having from 5 to 12 atoms in the lactam ring. Of these ε-caprolactam is especially preferred due to its outstanding physical characteristics such as toughness and tensile strength. Minor amounts of other lactams or polyamide monomers may be included with the predominant ω-lactam so as to form a copolymer if desired. The casting liquid contains from 0.5 to 5 mole percent, and preferably from 1 to 2 mole percent of an anionic polymerization catalyst. The catalysts are alkali metals or alkaline earth metals in either metallic form or in the form of hydrides, hydroxides, acetates, oxides, borohydrides, carbonates, bicarbonates, amides, methoxides, ethoxides, alkyls, benzoates, or aryls. Examples of preferred catalysts are lithium metal, sodium metal, potassium metal, lithium hydride, sodium hydride, potassium hydride, lithium methoxide, sodium methoxide and potassium methoxide. In addition to the catalyst, it is necessary to have from 0.01 to 2 mole percent, and preferably from 0.2 to 0.5 mole percent of a cocatalyst present. Some cocatalysts have a tertiary nitrogen atom which has at least two activating groups such as carbonyls adjacent the nitrogen. Some of these compounds have structures which may be written $$R_1-N-R_2$$
$$\quad\ \ |$$
$$\quad\ \ R_3$$

wherein $R_1$ is selected from the group consisting of

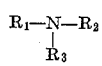

and

where $R_2$ is selected from the group consisting of $R_1$ and $-N=O$, and $R_3$ is selected from the group consisting of $R_1$, aryls, aralkyls, alkaryls, cycloalkyls, and any of the foregoing substituted with additional radicals selected from the group consisting of carbonyl, N-substituted carbamyl, alkoxy, ether, sulfonyl, and tertiary amino. Examples of such cocatalysts include N-acetyl-2-pyrrolidone,
N-acetyl-ε-caprolactam,
N-benzoyl-ε-caprolactam,
N-benzoyl-ε-valerolactam,
N-ethyl carbamyl-ε-caprolactam,
N-propionyl-ω-caprylolactam,
N-toloyl-ω-decanolactam,
N-phenylsuccinimide,
N-phenylmaleimide,
N-methylsuccinimide,
N-methylphthalimide,
N-acetyltetrahydrophthalimide,
N-benzoylsuccinimide,
N-benzoylphthalimide,
N,N'-di(phenylcarbamyl)-N,N'-dimethylurea,
ethylene disuccinimide,
N,N-diacetylmethylamine,
N,N-dibenzoylaniline,
triacetamide,
N-acetyl-N-formyl ethylamine,
N-propionylsaccharin,
N-acetyl-N-ethyl-p-toluenesulfonamide,
N-ethyl-N-lauroylethanesulfonamide,
N,N-diacetylmethanesulfonamide,
N-(phenylsulfonyl)succinimide,
N-methylsaccharin,
N-acetylsaccharin,
N-acetyl-N-methylbenzenesulfonamide,
6,12-di(phenylsulfonyl)-sym-dibenzo-6,12-diazacyclooctane-5,11-dione,
N,N-di(p-toluenesulfonyl)anilide,
N,N-di-(benzenesulfonyl)methylamine,
N,N-di(methanesulfonyl)ethylamine,
N-nitroso-2-pyrrolidone,
N-nitrosuccinimide,
N,N-diacetylnitrosoamine,
N-nitroso-N-acetyl-propylamine,
N-nitroso-N,N'-di-n-butylurea,
N-methyl-N-nitrosourea,
N-nitroso-N-methyl-benzenesulfonamide,
N-nitroso-N-methyl-toluene-sulfonamide,
N-nitroso-N-ethyl-methanesulfonamide,
N-nitroso-N-phenylethyl butanesulfonamide,
1-acetyl-2-thiohydantoin,
N-thiobenzyl-2-pyrrolidone,
N-thiopropionylmaleimide, and
N-phenyldithiosuccinimide.

Some other cocatalysts have the structures,

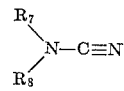

wherein $R_4$, $R_5$, and $R_6$ represent monovalent, saturated, unsubstituted, unbranched or branched alkyl radicals, a monovalent, unsubstituted, cycloalkyl radical, a monovalent, unsubstituted or nucleus-halogenated, unbranched or branched alkaryl radical, and wherein $R_7$ and $R_8$ represent the same radicals as described above for $R_6$ or hydrogen.

Examples of such cocatalysts include methyl isocyanate,
ethyl isocyanate,
n-propyl isocyanate,
isopropyl isocyanate, n-butyl isocyanate,
2-butyl isocyanate,
phenyl isocyanate,
phenylethyl isocyanate,
p-diphenyl isocyanate,
p-phenylene diisocyanate,
2,4-tolylene diisocyanate,
di(p-isocyanatophenyl)methane,
2,2-di(p-isocyanatophenyl)propane,
p,p-diisocyanatodiphenyl,
N,N-di(isocyanatoethyl)amine,
1,3,5-triisocyanatobenzene,
1,3,8-triisocyanatonaphthalene,
tri(p-isocyanatophenyl)methane,
4(p-isocyanatobenzyl)-1,3-phenylene diisocyanate,
2,5-di(p-isocyanatophenyl)phenyl isocyanate,
2,4-di(p-isocyanatobenzyl)phenyl isocyanate,
hexyl isocyanate,
octyl isocyanate,
cyclohexyl isocyanate,
chlorophenyl isocyanate,
diisopropyl-carbodiimide,
dibutyl-carbodiimide,
dioctyl-carbodiimide,
dicyclohexylcarbodiimide,
N,N-dimethyl-cyanamide,
N-cyclohexyl-N-methyl-cyanamide,
N,N-dicyclohexyl-cyanamide,
N-phenyl-N-methyl-cyanamide,
N,N-diphenyl-cyanamide, and N,N-di-(chlorophenyl)-cyanamide the 2/1 adduct of ε-caprolactam and 2,4-toluene diisocyanate, the 2/1 adduct of ε-caprolactam and hexamethylene diisocyanate, the 2/1 adduct of ε-caprolactam and 4,4'-methylene-bis(phenyl isocyanate), the 3/1 adduct of ε-caprolactam and 1,3-xylene-2,4,6-triisocyanate,
N,N'-carbonylbiscaprolactam,
N,N'-oxalylbiscaprolactam,
N,N'-sebacoylbiscaprolactam,
N,N'-azeloylbiscaprolactam.

Other cocatalysts include symmetrical triazine derivatives having the formula

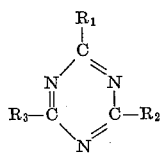

in which $R_1$ is a radical selected from the group consisting of aryloxy, alkaryloxy, nitroaryloxy, and halogen, and $R_2$ and $R_3$ are radicals selected from the group consisting of hydrogen, alkyl, alkenyl, aryl, alkaryl, aryloxy, alkaryloxy, nitroaryloxy, alkoxy, halogen, and dialkylamino. Examples of such cocatalysts include 2,4,6-triphenoxy-s-triazine,
2,4-diphenoxy-s-triazine,
2,4-diphenoxy-6-dimethylamino-s-triazine,
2,4,6-tri(p-carbonylphenoxy)-s-triazine,
2,4-dichoro-6-dimethylamino-s-triazine,
2,4-bis-dichloroamino-6-chloro-s-triazine,
2,4-dimethoxy-6-chloro-s-triazine,
2,4-dichloro-6-phenyl-s-triazine,
2,4,6-trimethoxy-s-triazine, and
2,4,6-tri(dimethylamino)-s-triazine.

Other cocatalysts include substituted benzimido compounds having the formula

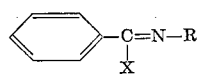

where R is an organic radical particularly a cyclic or acyclic hydrocarbon radical, and X is a halogen or is an —OR' group wherein R' is an acylic or cyclic hydrocarbon radical. Examples of such cocatalysts include N-phenylbenzimido chloride,
N-methylbenzimido chloride, and
phenyl N-phenylbenzimido ether.

Another class of cocatalysts is the dilactam ethers characterized by the formula

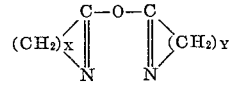

wherein X and Y may be alike or different and represent integers of 3 or greater. Examples of such cocatalysts include dibutyrolactam ether, divalerolactam ether, dicaprolactam ether, dienantholactam ether, dicaprylolactam ether, and dilaurolactam ether. Other effective cocatalysts include 2,2,4,4-tetramethyl-1,3-cyclobutanedione, lactones, particularly β-lactones such as pivalolactone and 2,2,4-trimethyl-3-hydroxy 3-pentenoic acid β-lactone having the structure

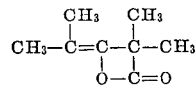

1-diphenylcarbamylimidazole, 1-diphenylcarbamylpyrazole, 1-diphenylcarbamyl-1,2,4-triazole, 1-diphenylcarbamylbenzimidazole, 1-diphenylcarbamylbenzo-1,2,3-triazole, polymers of the formula $—(CF_2S)_x—$ where X is 3,000 to 6,000, 1-dimethylcarbamyl-3-methylindazole, 1-dimethylcarbamylpyrazole, 1-diphenylcarbamyl-3,5-dimethylpyrazole, 1-diphenylcarbamyl-4-chloropyrazole, 1-dimethylcarbamyl-3,5-dimethylpyrazole, 1-phenylcarbamylimidazole, 1-phenylcarbamyl-1,2,3-triazole, 1-phenylcarbamylpyrazole. Other cocatalysts include monomeric aromatic esters such as phenyl propionate, 2-naphthyl butyrate, 2-(1-aminonaphthyl)stearate, resorcyl diacetate, phloroglucyl tripropionate, diphenyl 1,1-cyclohexanedicarboxylate, diphenyl 1,4-cyclohexanedicarboxylate, di(4-aminophenyl)terephthalate, phenyl p-aminobenzoate, 2,6-naphthyl diacetate. This class also includes polymeric aromatic esters of the formula

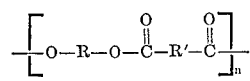

where R is an aromatic biradical bonded through an aromatic carbon to the oxygen atoms adjacent thereto and R' is an aromatic, aliphatic, or cycloaliphatic biradical bonded by at least one group consisting of carbon and tertiary nitrogen directly to the carbonyl radicals adjacent thereto, and n is preferably about from 10 to 500. Such polymeric aromatic esters include poly(hydroquinone adipate), poly(diphenylolpropane terephthalate), poly(5-chloro-resorcinol - 1,4-cyclohexanedicarboxylate), poly(methoxycatechol sebacate), poly(2-amino-1,5-dihydroxy-naphthalene phioionate), poly(diphenylolpropane adipate), poly(diphenylolpropane 5-tert-butylisophthalate), poly[(hydroquinone N,N'-diphenyl)phenylene bis-(carbamate)], poly(1,4-phenylene N-phenylcarbamate), poly(diphenylolpropane 5-chloroisophthalate), poly(2,2',6,6'-tetrachlorodiphenylolpropane 5-chloroisophthalate), poly(diphenylolbutane isophthalate), poly(2,2',6,6'-tetrachlorodiphenylolbutane terephthalate), poly(diphenylolpropane terephthalate), poly(4-hydroxybenzoate), poly(4 - hydroxy-2-chlorobenzoate), poly(4 - hydroxy-4'-biphenylcarboxylate), poly(m-hydroxybenzoate), and poly(4-hydroxy-2-nitrobenzoate) each of said polymers having an inherent viscosity of from 0.05 to 5.0. Another class of cocatalysts has the formula

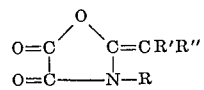

wherein R is a radical selected from the group consisting of alkyl, cycloalkyl and aryl radicals of up to 20 carbon atoms and R' and R" are radicals of up to 20 carbon atoms selected from the group consisting of alkyl, cycloalkyl and aryl radicals and cycloalkyl radicals containing both R and R". Examples of such cocatalysts include 2-diethylmethylene-3-ethyloxazolidine-4,5 - dione, 2-ethylisopropylmethylene-3-ethyloxazolidine-4,5-dione, and 3-butyl-5,5-dimethyl-2-thio-2,4-oxazolidenedione. Another class of cocatalysts is the organic carbonates having at least one carboxylic aromatic group bonded through aromatic carbon to an oxygen of a carbonate group. The carbonate may be monomeric or, preferably, polymeric. Examples of such monomeric carbonate cocatalysts include diphenyl carbonate, sodium phenyl carbonate

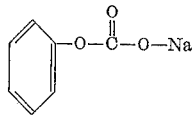

and

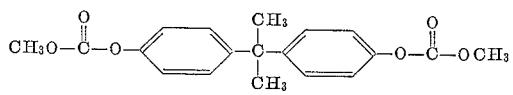

Examples of polymeric organic carbonate cocatalysts include poly[2,2-propanebis(4-phenyl carbonate), diethyleneglycolbis(phenyl carbonate),

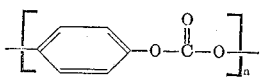

and

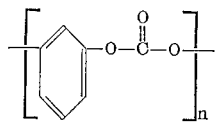

wherein the polymer contains from 10 to 400 monomeric units in each case. Another useful cocatalyst is sebacoyl-bispyrazole.

The calcium carbonate used must be dry, as any water will inhibit the polymerization, and free from contaminants which will react with any one of the ω-lactams, the anionic catalyst, or the cocatalyst. In addition to the requirement of high purity, the calcium carbonate must have a particle size distribution within certain critical limits. Due to difficulties in handling the ω-lactam prior to polymerization, it is desirable that the ω-lactam monomer solution containing the calcium carbonate have a viscosity of less than 1,000 centipoises and for ready handling this preferably is less than 600 centipoises as measured at 130° C., in a Brookfield Viscosimeter. In order to have the necessary toughness, it is preferred to have less than 24 weight percent of the calcium carbonate particles under 5 microns in diameter. Since large particles tend to settle out of the solution more rapidly than small particles, it is necessary to use small particles. Furthermore, a high percentage of small particles reduced the toughness of the product. Preferably the median of the particles ranges from 7 to 20 microns and less than 20 weight percent of the particles are over 25 microns in diameter. In order to have a homogeneous composition, it is preferred to eliminate substantially all particles of over 100 microns in diameter. The upper limit on the size of particles used is controlled by several considerations. If toughness is the only consideration the maximum median size of the particles can be increased from 20 microns to 45 microns. However, blush resistance in these calcium carbonate filled ω-lactam polymers is greatly reduced if over 20 weight percent of the calcium carbonate particles have a diameter of over 25 microns, or if the median diameter of the particles is over 20 microns. The size of calcium carbonate particles reported throughout this case are ascertained by means of Sharples "Micromerograph," manufactured by The Sharples Corp. of Philadelphia, Pa. This instrument measures the particle size distribution of powdered materials by application of Stokes' Law of Fall for the velocity of particles falling in a gas. In making this determination a sample of powder is introduced into the top of a sedimentation column dispersed as individual particles. The particles fall down the column onto a pan attached to a recording balance. The accumulated weight of the pan is continuously advanced by a servoelectronic system. The balancing current which is proportional to the weight on the pan, is recorded on a moving chart. This chart provides a record of weight versus time which is converted into a continuous particle size distribution curve by the use of calibrated templates. The particle size distribution curves of the calcium carbonate samples used in the examples are reported in FIGURE 1.

In carrying out the process of this invention it is preferred to divide the ω-lactam to be used into two portions, one portion containing the anionic catalyst and the other the cocatalyst. When mixing the calcium carbonate with the ω-lactam there are two considerations involved. The first of these is that the viscosity of the solution must not be so high that the solution cannot be handled as by forcing through pipes under pressure. This means that the viscosity of the solutions preferably does not exceed about 1,000 centipoises shortly after stirring of the solution. The other consideration is that the solution should be such that the calcium carbonate does not settle excessively on standing for moderate periods of time such as from one half to two hours. It has been found that low concentrations of calcium carbonate tend to settle more rapidly than high concentrations of calcium carbonate in the ω-lactam. Therefore, it is often preferred to add all of the calcium carbonate to one portion of the ω-lactam containing either the anionic catalyst or the cocatalyst. In general, the portion containing the anionic catalyst is the preferred portion for addition of the calcium carbonate, since many of these catalysts act as dispersing agents for the calcium carbonate.

The temperature used and the amount of catalyst and cocatalyst used affect the time it takes for the ω-lactam to polymerize. Since the average molecular weight of the final polymer is controlled by the amount of catalyst and particularly cocatalyst used, it may be necessary to vary the temperature at which the ω-lactam is polymerized in order to achieve a practical reaction time while still obtaining the average molecular weight desired. The more catalyst and cocatalyst present, the faster the polymerization reaction will take place at a given temperature. The higher the temperature, the faster the reaction, all other things being equal. While a slow reaction rate makes it easy to handle the materials (monomer solution) prior to casting and in the casting operation itself, it is preferred to have as high a rate of reaction as possible since the rate of reaction controls the amount of pieces that can be made with a given mold or casting facility. The time of reaction is most conveniently described in terms of the time it takes for the polymerization reaction mixture to reach its maximum temperature. (The polymerization of ω-lactams is an exothermic reaction.) In a large volume casting operation of moderate sized pieces such as chair seats, chair backs, small desk tops, etc., it is preferred to have the reaction mixture reach its maximum temperature within 3 minutes' time. This time of reaching maximum temperature is hereinafter referred to as "peak time". In order to handle the solutions readily, it is preferred to have the catalyst and cocatalyst present in an amount such that the initial polymerization temperature is between 75 and 220° C.

The following examples are illustrative of the invention.

EXAMPLE I

Four hundred milliliters of ε-caprolactam solution containing 2.0 mole percent of sodium caprolactam is heated to 150° C., and transferred under a nitrogen blanket, to a two-liter stainless steel beaker containing 400 grams of dry calcium carbonate, having the particle size distribution reported as line 1 in FIGURE 1; the beaker and its contents having been previously heated to 150°

TABLE I

| Example | Calcium Carbonate From Line No. | Wt. Percent Calcium Carbonate Based on Total Composition | Physical Properties at 50% Relative Humidity | | | Dry as Cast | | |
|---|---|---|---|---|---|---|---|---|
| | | | Tensile Strength, p.s.i. | Ultimate Elongation, Percent | Secant Modulus at 0.5% Strain, p.s.i.×10⁻³ | Tensile Strength, p.s.i. | Ultimate Elongation, Percent | Secant Modulus at 0.5% Strain, p.s.i.×10⁻³ |
| 1 | 1 | 50 | 3,550 | 38 | 382 | 9,600 | 0.73 | 1,630 |
| 2 | 2 | 50 | 3,350 | 35 | 423 | 10,000 | 0.78 | 1,550 |
| 3 | 3 | 50 | 3,190 | 15 | 339 | 9,800 | 0.68 | 1,610 |
| 4 | 4 | 50 | 3,340 | 20 | 413 | 10,700 | 0.78 | 1,660 |
| 5 | 5 | 50 | 4,260 | 3.2 | 498 | 10,400 | 0.72 | 1,630 |
| 6 | 6 | 50 | 3,500 | 38 | 385 | 9,680 | 0.74 | 1,690 |
| 7 | 7 | 50 | 3,960 | 8.9 | | 8,870 | 0.38 | |
| 8 | 8 | 50 | 3,740 | 27 | 437 | 9,600 | 0.78 | 1,680 |
| 9 | 1 | 70 | 2,630 | 1.3 | 525 | 6,640 | 0.3 | |
| 10 | 6 | 70 | 2,210 | 2.3 | 440 | 4,550 | 0.3 | |
| 11 | 8 | 70 | 2,270 | 20 | 384 | 7,900 | 0.46 | |
| 12 | 1 | 50 | 4,080 | 21 | 612 | 9,400 | 1.1 | 1,100 |
| 13 | 8 | 60 | 2,860 | 10 | 485 | 8,000 | 0.6 | 1,320 |
| 14 | 5 | 45 | 4,490 | 20 | 418 | | | |
| 15 | 5, 1 | 37½, 12½ | 4,110 | 20 | 463 | | | |

C. in an oven. The sodium caprolactam solution and the calcium carbonate are gently mixed by stirring, under a nitrogen blanket, to obtain a mixture free of any lumps (over ¼″ in diameter) of calcium carbonate. The calcium carbonate is dispersed in the sodium caprolactam solution by agitation with a propeller type of stirrer (2¼″ in diameter) at a speed of 3000 r.p.m. for three minutes using a one-inch stainless steel baffle, the mixing being conducted under a blanket of nitrogen and with sufficient heat from a hot plate to maintain the temperature of the mixture at 140 to 150° C. To remove entrapped gases the molten composition is evacuated. The dispersed composition is transferred, under a blanket of nitrogen to a one-liter flask (previously heated in an oven to 150° C.) and house vacuum applied for two minutes. While evacuating, the filter flask and contents are vibrated with a mechanical vibrator. When the temperature of the composition reaches 130° C. (shortly after the evacuation process), 2.73 grams (0.4 mole percent) of N,N′-dimethyl-amino-3,5-dichloro-triazine are added, mixed manually with a spatula for 0.3 minute, the mixture evacuated for 0.1 minute and the composition cast in a mold heated to 150° C. The mold cavity measures 12″ wide by 12″ deep by ⅛″ thick. The resin polymerizes within several minutes and the sheet can be released from the mold in about ten minutes.

Example I is repeated using the same catalyst, cocatalyst, mold and technique, except where hereinafter stated, but varying the particle size range of the calcium carbonate and the amount of calcium carbonate used. The properties of the various runs are reported in Table I, including the properties of the casting made in Example I. The calcium carbonate "Line No." data in Table I refers to the number of the line in FIGURE 1 which corresponds to the particle size distribution of the calcium carbonate used in the particular example involved. In Example 12, 0.2 mole percent of methylene bis(4 phenyl isocyanate) and 1.0 mole percent of sodium caprolactam are used as the cocatalyst and catalyst. In Example 13, 0.2 mole percent of the adduct of methylene bis(4 phenyl isocyanate) and 1.0 mole percent of sodium caprolactam are used as cocatalyst and catalyst. In Examples 14 and 15, 0.3 mole percent of the adduct of toluene 2,4-diisocyanate and 1.0 mole percent of sodium caprolactam are used as cocatalyst and catalyst. In each of the Examples 12 to 15, 1.0 weight percent based on the total composition of titanium dioxide and 0.5 weight percent based on the total composition of a mixture of 2 parts Turkey burnt umber (ferric oxide), 1 part Cadmium yellow and 1 part Cadmium orange are added the latter two pigments being mixtures of cadmium selinide and cadmium sulfide. The panels produced in Examples 12 to 15 had a tan color closely resembling conventional maple furniture in color.

*Example 16*

Four hundred milliliters of caprolactam solution containing 2.0 mole percent of sodium caprolactam is heated to 125° C. and transferred under a nitrogen blanket, to a two-liter stainless steel beaker containing 800 grams of dry calcium carbonate having the particle size distribution reported as line 1 in FIGURE 1; the beaker and its contents having been previously heated to 125° C. in an oven. The sodium caprolactam solution and the calcium carbonate are gently mixed by stirring, under a nitrogen blanket, to obtain a mixture free of any lumps (over ¼″ in diameter) of calcium carbonate. The calcium carbonate is dispersed in the caprolactam solution by agitation with a propeller type of stirrer (2¼″ in diameter) at a speed of 3000 r.p.m. for three minutes using a one-inch stainless steel baffle, the mixing being conducted under a blanket of nitrogen and with sufficient heat from a hot plate to maintain the temperature of the mixture at 125° C. The dispersion has an apparent viscosity of approximately 400 centipoises at 125° C. immediately after dispersing as determined with a Brookfield Viscosimeter. The dispersion is stable as shown by storing at 125° C. without agitation for an hour with no appreciable settling of the filler occurring. In contrast a dispersion containing 400 milliliters of sodium caprolactam solution and 400 grams of the same calcium carbonate as used in the example, shows a heavy sediment of filler on the bottom of the vessel, when the composition is stored at 125° C. for an hour without agitation. In the meantime the apparent viscosity at 125° C. has increased to approximately 1600 centipoises, since the composition is thixotropic in nature. On longer storage at 125° C., for example six hours, without agitation, no sediment of filler is formed on the bottom of the vessel although a gradient in apparent viscosity from the top to the bottom of the vessel is observed. The composition is readily redispersed by mild agitation. The dispersion is evacuated to remove entrapped gases. The composition is transferred, under a blanket of nitrogen, to a one-liter flask (previously heated in an oven to 125° C. and house vacuum applied for two minutes. The evacuated composition is now added to a solution of 5.46 g. N,N′-dimethyl-amino-3,5,-dichlorotriazine (0.4 mole percent in the final casting composition) and 400 milliliters of caprolactam monomer at 175° C., mixed manually with a spatula for 0.3 minute, the mixture evacuated for 0.1 minute and the composition cast in a mold heated to 150° C. The mold cavity measures 12 inches wide by 12 inches deep by ⅛ inch thick. The ω-lactam polymerizes within several minutes and the sheet can be released from the mold in about 10 minutes. The finished sheet is excellent in quality and uniform in composition. There is no evidence of settling of the $CaCO_3$ particles during polymerization in the vertical mold, as confirmed by the narrow range of specific gravity (1.578 to 1.580) of two-inch squares cut from 10 locations in various parts of the sheet. The viscosity results reported in Table II and used elsewhere in this case are obtained with a Brookfield Viscosimeter immediately after dispersing the calcium carbonate into the lactam containing 2 mole percent sodium caprolactam at 130° C.

TABLE II

| Calcium Carbonate Line Number | Wt. percent of $CaCO_3$ | Viscosity centipoises |
| --- | --- | --- |
| 1 | 50 | 35–80 |
| 3 | 50 | 10–40 |
| 5 | 50 | 30–45 |
| 8 | 60 | 55–65 |
| 6 | 60 | 55–95 |
| 1 | 60 | 135–185 |
| 6 | 65 | 150–280 |

The filled compositions of this invention may also be produced in the form of a foam by incorporating a blowing agent in the ω-lactam prior to polymerization. Blowing agents as used herein refers to unstable compounds which decompose when heated to give off a gas, usually nitrogen, which is dispersed into the polymer to lower its density. The preferred blowing agents are allylic azides, having an azido methyl group bonded to an unsaturated carbon atom. These azides as well as their method of preparation are described more fully in copending application Ser. No. 171,356, filed Feb. 6, 1962. Aliphatic azides of 8 to 24 carbon atoms and benzyl azides, especially alkyl substituted benzyl azides of 8 to 18 carbon atoms, are preferred. Examples of the aforementioned azides are 1-azido-5,5,7,7-tetramethyloctene-2; 1,3-dimethylbenzyl azide; 1,4-bis-(azidomethyl)durene; p-phenoxybenzyl azide; monoazidomethyldurene; dodecylbenzyl azide; 2,4,5-trimethylbenzyl azide; 3-azido-1-heptene; benzyl azide; methoxybenzyl azide; and mixtures thereof.

The allylic azides are used in proportions varying from about 0.1 part per 100 parts of ω-lactam to about 2 parts per 100 parts of ω-lactam depending on the density desired. The preferred range is between about 0.1 part per 100 parts of ω-lactam to about 1.4 parts per 100 parts ω-lactam.

The allylic azides are generally added just before initiating polymerization. They should not be exposed to high temperatures in the presence of basic catalysts for extended periods because they lose gas. The allylic azide can be, for example, added to a portion of molten ω-lactam containing the cocatalyst mixture just before combination of this portion with the portion containing anionic catalyst or equally well to the portion of ω-lactam containing the anionic catalyst.

Examples 17 to 19 are illustrative of forming foamed calcium carbonate filled compositions.

Example 17

A porton of dry ε-caprolactam (80 parts) is mixed with 1.02 parts of NaH/oil (50/50 by weight) at 80° C. in a tube. The tube is then sparged with dry nitrogen and heated to 150° C. Potassium stearate (4.8 parts) is then added and mixed well. To a second portion of dry ε-caprolactam (80 parts) is added 80 parts of precipitated $CaCO_3$ (average particle size 10 microns, 8% particles less than 5 micron, 4% particles greater than 25 micron, maximum particle size 33 microns) and the portion heated to 150° C. while sparging with nitrogen. 1,1,3,3-tetramethylcyclobutanedione (0.8 part) and 1.46 parts of 1-azido-5,5,7,7-tetramethyloctene-2 are rapidly added to the second portion of ε-caprolactam. The two portions of ε-caprolactam are quickly mixed, agitated for 10 seconds, and poured into a stainless steel mold (0.7 x 17.5 x 27.5 cm.), heated in an oil bath to 150° C. After 10 minutes the mold is removed from the oil bath, and opened. The sheet of poly-ε-caprolactam obtained has a density of 0.73 g./cc., and a moderately fine cell structure.

Example 18

Example 17 is repeated substituting 0.40 mole percent of the 2/1 ε-caprolactam-2,4-toluenediisocyanate adduct for the dione catalyst of Example 17. The resulting foam sheet has a density of 0.79 g./cc.

Example 19

To one portion of dry ε-caprolactam (80 parts) is added 0.68 part of NaH/oil (50/50 by weight) at 80° C. The lactam is agitated with nitrogen while the temperature is being raised to 150° C. Then 4.8 parts of potassium stearate is dissolved in the melt. To another 80 part portion of ε-caprolactam is added 80 parts of precipitated calcium carbonate described in Example 17, and 0.88 part of 1,4-diazidomethyldurene. The melt is heated to 150° C., 0.85 part of 2,2,4-trimethyl-3-hydroxy-3-pentenoic acid β-lactone and the first ε-caprolactam portion are added, the mixture sparged with nitrogen for 10 seconds and then poured into the stainless steel mold described in Example 17. Foaming ensues immediately. After 10 minutes the mold is opened. The foamed sheet has a density of 0.68 g./cc. and a moderately fine cell structure.

The calcium carbonate-filled compositions are very tough in final use compared with other filled compositions. Articles of the freshly cast composition are anhydrous or nearly so and brittle. However, after the polycaprolactam has absorbed some moisture, which acts as a plasticizer, such articles become surprisingly tough. Toughness can be readily defined for the subject compositions in terms of their ultimate elongation after being conditioned for over 16 hours at 120° C., in steam to effect a 50% relative humidity conditioning. This is for a piece ⅛ inch thick. Thicker pieces may require a longer conditioning period. After being thus conditioned the preferred compositions have an ultimate elongation of over 5%.

The cast compositions of this invention are readily pigmented. In addition to the tan color produced in Examples 12 to 15, other colors have been produced. In general any pigment which does not react with any one of the lactam, catalyst or cocatalyst is suitable for imparting color to the compositions of this invention. Such suitable pigments include Cadmium Red, Cadmium Orange, Cadmium Yellow Ferro Turquoise, Carbon Black, and Turkey burnt umber. The surprising ease with which the compositions of this invention can be pigmented is illustrative by repeating Example 12 but substituting 0.001 weight percent of a furnace black of 0.030 micron average particle diameter, for the pigments used in Example 12, a medium gray colored panel is obtained.

The Rockwell M hardness of the panels of this invention varies from 60 to 90, as determined by ASTM D–785. The blush resistance of particular panels is determined by visual observation of the dent made in performing the Rockwell M Hardness test on pigmented panels. If a lighter colored ridge is formed around the dent, the panel is considered to have poor blush resistance. If no change in color of the panel is observed around the dent, the panel is considered to have excellent blush resistance. A very slight blush around the dent is considered good blush resistance.

The hardness and blush resistance of various panels are reported in Table III.

TABLE III

| Panel of Example | Rockwell M Hardness | Blush Resistance |
|---|---|---|
| 13 | 85 | Poor. |
| 14 | 63 | Excellent. |
| 15 | 66 | Fair. |

The compositions of this invention are useful for casting chair backs, chair seats, desk and table tops and furniture panels such as cabinet sides, etc.

I claim:

1. A casting process comprising the steps of mixing calcium carbonate particles with an ω-lactam containing anionic polymerization catalyst, to form a first liquid casting solution, mixing calcuim carbonate particles with an ω-lactam containing an anionic lactam polymerization cocatalyst to form a second liquid casting solution and commingling said first and second casting solutions in a mold maintained at from 75 to 220° C. to effect polymerization of said ω-lactam, the total mass of said first and second casting solutions containing from 30 to 70 weight percent of the polymerization mixture which contains ω-lactam, from 0.5 to 5 mole percent based on the ω-lactam of an anionic polymerization catalyst, from 0.01 to 2 mole percent based on the lactam of a lactam anionic polymerization cocatalyst, and from 30 to 70 weight percent of calcium carbonate particles which particles have a median size of from 7 to 45 microns in diameter.

2. The process of claim 1 wherein the ω-lactam consists essentially of ε-caprolactam.

3. The process of claim 2 wherein less than 24 weight percent of the particles are under 5 microns in diameter.

4. The process of claim 3 in which the calcium carbonate particles have a median size of under 20 microns diameter and less than 2.0 weight percent of the particles have a diameter of over 25 microns.

5. A casting process comprising the steps of mixing calcium carbonate particles with an ω-lactam solution containing an anionic polymerization catalyst to form a liquid casting solution, directing said solution into a mold along with a solution of an ω-lactam containing an anionic lactam polymerization cocatalyst, and maintaining said mold at from 75 to 220° C. to effect polymerization of said ω-lactam the total mass of said first and second casting solutions containing from 30 to 70 weight percent of the polymerization mixture which contains ω-lactam, from 0.5 to 5 mole percent based on the ω-lactam of an anionic polymerization catalyst, from 0.01 to 2 mole percent based on the ω-lactam of a lactam anionic polymerization cocatalyst and from 30 to 70 weight percent of calcium carbonate particles which particles have a median size of from 7 to 45 microns in diameter.

6. The process of claim 5 wherein the ω-lactam consists essentially of ε-caprolactam.

7. The process of claim 6 wherein less than 24 weight percent of the particles are under 5 microns in diameter.

8. The process of claim 7 in which the calcium carbonate particles have a median size of under 20 microns diameter and less than 2.0 weight percent of the particles have a diameter of over 25 microns.

9. A casting process comprising the steps of mixing calcium carbonate particles with an ω-lactam solution containing an anionic lactam polymerization cocatalyst to form a liquid casting solution directing said solution into a mold along with a solution of an ω-lactam containing an anionic polymerization catalyst and maintaining said mold at from 75 to 220° C. to effect polymerization of said ω-lactam, the total mass of said first and second casting solutions containing from 30 to 70 weight percent of the polymerization mixture which contains ω-lactam, from 0.5 to .5 mole percent based on the ω-lactam of anionic polymerization catalyst, from 0.01 to 2 mole percent based on the ω-lactam of a lactam anionic polymerization cocatalyst and from 30 to 70 weight percent of calcium carbonate particles which particles have a median size of from 7 to 45 microns.

10. The process of claim 9 wherein the ω-lactam consists essentially of ε-caprolactam.

11. The process of claim 10 wherein less than 24 weight percent of the particles are under 5 microns in diameter.

12. The process of claim 11 in which the calcium carbonate particles have a median size of under 20 microns diameter and less than 2.0 weight percent of the particles have a diameter of over 25 microns.

13. The process of claim 1 wherein from 0.1 to 1 part of a blowing agent per 100 parts total of ω-lactam used is incorporated in at least one portion of ω-lactam.

References Cited

UNITED STATES PATENTS 3,228,916  1/1966  Pietrusza et al. _____ 260—78
3,236,789  2/1966  Fuller _____ 260—2.5

FOREIGN PATENTS 660,659  4/1963  Canada.

OTHER REFERENCES

Oleesky, S. S., et al., Society of Plastics Industry, "Handbook of Reinforced Plastics" 1964, Rheinhold Publishing Co., (pages 194–95, 200–202, 221 relied on).

MORRIS LIEBMAN, *Primary Examiner.*

A. HOLTZ, J. FROME, *Assistant Examiners.*